(12) United States Patent
Hillman et al.

(10) Patent No.: US 7,415,630 B2
(45) Date of Patent: Aug. 19, 2008

(54) CACHE COHERENCY DURING RESYNCHRONIZATION OF SELF-CORRECTING COMPUTER

(75) Inventors: Robert A. Hillman, San Diego, CA (US); Mark Steven Conrad, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 61 days.

(21) Appl. No.: 11/356,945

(22) Filed: Feb. 16, 2006

(65) Prior Publication Data

US 2006/0143513 A1 Jun. 29, 2006

Related U.S. Application Data

(63) Continuation-in-part of application No. 10/418,713, filed on Apr. 17, 2003.

(60) Provisional application No. 60/451,041, filed on Feb. 28, 2003.

(51) Int. Cl.
*G06F 11/00* (2006.01)
(52) U.S. Cl. .............................. 714/11; 714/12; 714/13
(58) Field of Classification Search ................... None
See application file for complete search history.

(56) References Cited

U.S. PATENT DOCUMENTS

| 5,452,441 | A | * | 9/1995 | Esposito et al. | ............... 714/13 |
| 5,864,657 | A | * | 1/1999 | Stiffler | ........................ 714/15 |
| 6,622,216 | B1 | * | 9/2003 | Lin | ............................ 711/141 |
| 2004/0068595 | A1 | * | 4/2004 | Dieffenderfer et al. | ...... 710/105 |

OTHER PUBLICATIONS

Wikipedia—en.wikipedia.org/wiki/PCI_bus.*

* cited by examiner

*Primary Examiner*—Yolanda L Wilson
(74) *Attorney, Agent, or Firm*—Anatoly S. Weiser, Esq.

(57) ABSTRACT

A fault-tolerant computer uses multiple commercial processors operating synchronously, i.e., in lock-step. In an exemplary embodiment, redundancy logic isolates the outputs of the processors from other computer components, so that the other components see only majority vote outputs of the processors. Processor resynchronization, initiated at predetermined time, milestones, and/or in response to processor faults, protects the computer from single event upsets. During resynchronization, processor state data is flushed and an instance of these data in accordance with processor majority vote is stored. Processor caches are flushed to update computer memory with more recent data stored in the caches. The caches are invalidated and disabled, and snooping is disabled. A controller is notified that snooping has been disabled. In response to the notification, the controller performs a hardware reset of the processors. The processors are loaded with the stored state data, and snooping and caches are enabled.

22 Claims, 4 Drawing Sheets

CACHE COHERENCY DURING RESYNCHRONIZATION OF SELF-CORRECTING COMPUTER

REFERENCE TO RELATED PATENT DOCUMENT

This application is a continuation-in-part and claims priority of U.S. patent Application Ser. No. 10/418,713, entitled SELF-CORRECTING COMPUTER, filed on Apr. 17, 2003, which claims priority of U.S. Provisional Patent Application Ser. No. 60/451,041, filed on Feb. 28, 2003. Each of these related applications is hereby Incorporated by reference in its entirety, including all tables, figures, claims, and matter Incorporated by reference in these applications.

FIELD OF THE INVENTION

The present invention relates generally to computer systems. More Specifically, the present invention relates to fault-tolerant computer systems, such as Radiation-hardened computer systems for space applications.

BACKGROUND

Computer system reliability is always a concern, but much more so in some settings than in others. In space, for example, maintenance, repair, and replacement of computer systems are either extremely expensive or impossible. Furthermore, failure of a computer system may lead to complete or partial mission failure. Environmental factors present in such settings exacerbate these concerns. In space, the environmental factors include both ionizing and non-ionizing radiation.

Computer equipment failures due to ionizing radiation are generally classified in three groups: (1) Total Ionizing Dose ("TID"), (2) Latch-up, and (3) Single Event Upsets ("SEUs").

As the name implies, TID failures result from cumulative radiation exposure. TID failures can be dealt with by shielding computer equipment from radiation.

Single-event upsets result from change of state in an electronic device, such as a memory element. Thus, an SEU is not a "failure" in the conventional sense, but rather corruption of state information. Because heavy ions with high relative charges (i.e., multi-proton charges) tend to penetrate conventional shielding, such shielding generally does not reduce SEU occurrence frequency to an acceptable degree. The conventional approach to reducing SEUs due to heavy ions is to make radiation-hardened computer systems by designing custom cells for known computer architecture. This approach takes much time and money, and results in outdated designs. First, license for a known computer architecture (processor core) needs to be negotiated. Then, the cells of the processor core must be redesigned, and the processor core must be tested and put into production. The end result is a processor core that is older than then-current state-of-the-art commercial parts, and slower and less power-efficient than the original processor core architecture.

SUMMARY

A need thus exists for fault-tolerant computer architecture that does not suffer from these deficiencies.

Various embodiments of the present invention are directed to methods of operating a fault-tolerant computer system with a plurality of processors. According to one such method, the processors are operated synchronously in parallel while determining processor majority vote of processor output signals. When processor resynchronization is initiated, internal processor state data from the processors is flushed out and an instance of the flushed out internal processor state data is determined by processor majority vote. In other words, each data unit (e.g., bit, octet, byte) of the stored data instance is the same as the majority of corresponding data units of the processors. The instance of the internal processor data determined by processor majority vote is stored, for example, in unused locations of the main memory of the computer system. Processor caches are invalidated and disabled. Cache snooping is also disabled. The processors are then reset. Because snooping has been disabled, snooping does not take place while the processors initialize and come out of reset. After resetting, each processor is loaded with the instance of the flushed out internal processor state data. Snooping and caches are then enabled, and the processors resume operating synchronously in parallel.

In aspects of the invention, snooping is disabled after invalidating and disabling caches.

In aspects of the invention, resetting is performed after disabling snooping.

In aspects of the invention, snooping is enabled after the processors are loaded with the stored instance of the flushed out internal processor state data.

In aspects of the invention, the caches of the processors are flushed out after flushing out internal processor state data, but before invalidating caches.

In aspects of the invention, processor resynchronization is initiated at predetermined times or at predetermined milestones of a software application executed by the computer system.

In aspects of the invention, processor resynchronization is initiated in response to a single event upset in one of the processors.

In aspects of the invention, processor resynchronization is initiated at predetermined intervals. The intervals may be shortened in response to detection of an error in one of the processors, such as detection of loss of synchronization of one of the processors with respect to the other processors.

Various embodiments of the present invention are directed to fault-tolerant computer systems. One such system includes a plurality of processors configured to operate synchronously in parallel. The system further includes multi-module redundancy logic configured to receive outputs of the processors, and to determine majority processor vote for each of the outputs. The system also includes a resynchronization state machine configured to restore synchronous operation of the plurality of processors through processor resynchronization and prevent snooping while the processors come out of reset. Each processor may by coupled to the multi-module redundancy logic by a different processor bus.

In aspects of the invention, the fault-tolerant computer system also includes a processor correlation detector module configured to detect when an output of a processor differs from outputs of a plurality of corresponding outputs of the other processors.

In aspects of the invention, the multi-module redundancy logic provides the majority processor vote of at least a plurality of the processor outputs to other computer system components, such as memory controllers and bus controllers.

These and other features and aspects of the present invention will be better understood with reference to the following description, drawings, and appended claims.

DETAILED DESCRIPTION

Figure 1:
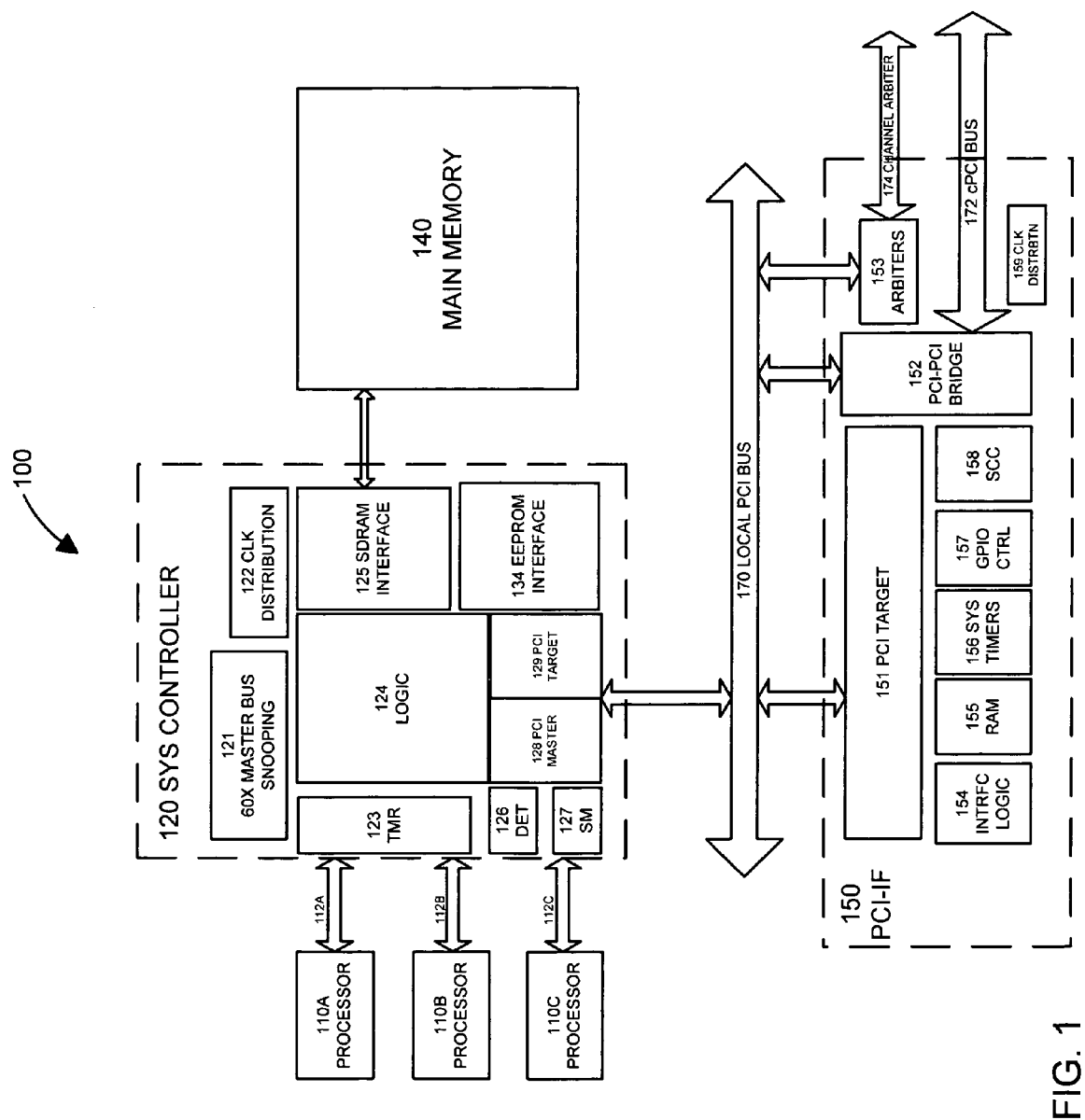
FIG. 1 is a high-level block diagram of a fault-tolerant computer system, in accordance with some aspects of the present invention.

In this document, the words "embodiment" and "variant" refer to particular apparatus, process, or article of manufacture, and not necessarily to the same apparatus, process, or article of manufacture. Thus, "one embodiment" (or similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity. Characterization of an embodiment as "exemplary" means that the embodiment is used as an example. Such characterization does not necessarily mean that the embodiment is a preferred embodiment; the embodiment may but need not be a currently preferred embodiment.

The words "couple," "connect," and similar expressions with their inflectional morphemes do not necessarily import an immediate or direct connection, but include connections through mediate elements within their meaning.

"Multi-module redundancy logic" refers to electronic circuitry that includes voting logic for examining each valid and relevant signal from each of three or more processors, and detects differences in the corresponding signals. When a particular processor output signal differs on the outputs of the three or more processors, the voting logic of the multi-module redundancy logic "votes" the relevant signal and operates on the assumption that the majority processor vote is correct and a fault occurred in the processor with the signal that differs from the majority vote value. Most components of the computer system (e.g., components unrelated to processor redundancy or to synchronous parallel processor operation) do not see outputs of the individual processors; instead, these components see the majority processor vote outputs generated by the multi-module redundancy logic. In three-processor systems, multi-module redundancy logic can be referred to as triple module redundancy logic.

A "processor bus" means a bus connecting a processor to multi-module redundancy logic, such as the triple module redundancy logic described below.

"Corresponding" processor inputs or outputs refer to the same functional connections on a plurality of processors. For example, data bus bit 0 on a first processor corresponds to data bus bit 0 on other processors.

Reference to a "plurality of processors operating synchronously in parallel," "processors operating in parallel," and similar expressions signify three or more processors operating synchronously to provide computer fault-tolerance, in the way described in the incorporated disclosures and in this document. Outputs of the processors are voted, and majority vote is output to most other components of the computer system. Corresponding inputs to each of the processors are identically driven and output to the system the same signal levels on corresponding outputs, and the computer system can tolerate faults in at least one of the processors. This can be achieved using multi-module redundancy logic.

"Processor resynchronization" refers to synchronization of processors in accordance with majority processor vote, as is described in more detail later in this document.

Other and further definitions and clarifications of definitions may be found throughout this document. All the definitions are intended to assist in understanding this disclosure and the appended claims, but the scope and spirit of the invention should not be construed as strictly limited to the definitions, or to the particular examples described in this specification.

Reference will now be made in detail to several embodiments of the invention that are illustrated in the accompanying drawings. Same reference numerals may be used in the drawings and the description to refer to the same components or steps. The drawings are in simplified form and not to precise scale. For purposes of convenience and clarity only, directional terms, such as top, bottom, left, right, up, down, over, above, below, beneath, rear, and front may be used with respect to the accompanying drawing. These and similar directional terms should not be construed to limit the scope of the invention.

Referring more particularly to the drawings, FIG. 1 illustrates a computer system 100 capable of tolerating single event upsets and other processor faults. The system 100 includes three processors 110A, 110B, and 110C coupled to a system controller chip module 120. The three processors 110 operate synchronously in parallel and are couple to the system controller module 120 via separate processor buses 112, as shown in the Figure. The system 100 further includes a main memory module 140 and a PCI-IF chip module 150, which is coupled to the system controller module 120 via a local PCI bus 170.

Each processor 110 can be implemented as a single chip until or as a combination of components, for example, as a chip set. In some variants, each processor 110 is a Power PC® ("PPC") processor made by International Business Machines Corporation of Armonk, N.Y. The invention, however, can work with a multitude of other processors. The processors 110 can be commercially available state-of-the-art processors.

The use of commercially available state-of-the-art processors allows the computer system 100 to achieve improved performance. Of course, the state-of-the-art processors for certain applications may provide a tremendous advantage.

Although the embodiment of FIG. 1 employs three processors 110, the invention is not limited to this number of processors. For example, processor fault tolerance can be enhanced further by increasing the number of processors. As will become more clear from the remainder of this document, the use of three processors 110 enables the computer system to tolerate a single event upset; higher-number processor systems can provide fault tolerance even in the case of multiple simultaneous (or almost simultaneous) single event upsets. Using an odd number of processors prevents tie votes in case of one single event upset.

The main memory module 140 may include one or more synchronous dynamic random access memory (SDRAM) chips, static random access memory (SRAM) chips, programmable read only memory (PROM) chips, electrically erasable programmable read only memory (EEPROM) chips, and/or other memory devices. In one exemplary variant, the main memory 140 includes (1) three SDRAM 72SD3232 one Gigabit chips protected by error correction coding (ECC), (2) a 32K×8 UT28F256 PROM chip protected by error correction coding, and (3) a 2 Megabit 79LV2040 EEPROM chip, which is also protected by error correction coding. Error correction coding, for example, parallel Reed-Solomon coding, provides memory fault tolerance in the computer system 100. The SDRAM chips can be employed, for example, as a scratch pad memory and to store instructions executed by the processors 110, as well as other data. Other main memory configurations and other memory devices also fall within the scope of the present invention.

As illustrated in FIG. 1, the PCI-IF module 150 is coupled to the system controller 120 via the local PCI bus 170. The module 150 includes a PCI target 151, 1553 interface logic 154, 1553 random access memory (RAM) 155, system timers 156, general purpose I/O (GPIO) controller 157, synchronous/asynchronous serial communications controller (SCC) 158, PCI-PCI bridge 152, arbiters 153, and clock distribution circuit 159.

In the illustrated embodiment, the system controller module 120 includes various logic components 124, such as memory controllers, interrupt handlers, direct memory access (DMA) modules, universal asynchronous receiver/transmitter (UART), watchdog time, and mission timer. The system controller module 120 also includes a PCI master 128, PCI target 129, SDRAM interface 125, EEPROM interface 134, triple module redundancy (TMR) logic 123, processor correlation detector module 126, and resynchronization state machine 127. The functions of the TMR logic 123, processor correlation detector module 126, and resynchronization state machine 127 will be discussed in more detail below.

The processors 110 operate synchronously in parallel. The TMR logic 123, which is coupled to each of the processors 110 via the processor buses 112, transmits synchronous signals between each of the processors 110 and the rest of the computer system 100. The processors 110 thus operate in complete synchronization with each other, at least until a fault event. The TMR logic 123 includes voting logic circuitry that examines each valid and relevant signal from each of the processors 110 and generates majority "votes" of the corresponding outputs of the three processors. The voting logic circuitry of the TMR logic 123 votes the relevant signal and operates on the assumption that the majority vote is correct and a fault occurred in the processor with the signal that differs from the majority vote value. For example, if the particular output of the processor 110A is at a logic 0 level while the corresponding outputs of the processors 110B and 110C are at a logic 1 level, the majority vote logic circuitry assumes that a fault occurred in the processor 110A. As a natural effect of majority voting, the TMR logic 123 isolates the faulty processor 110A, and continues to transmit signals between the non-faulty processors 110B/C and the rest of the computer system 100. Thus multiplexing is not required to isolate the faulty processor from the system.

Because the processors 110 are connected to most of the components of the system 100 through the TMR logic 123, these components are isolated from the processors 110 and see only the majority vote for each processor signal. Consequently, these components are not affected by the single event upset of the processor 110A and continue to function normally. In this way, the computer system 100 can continue to operate following a fault in the processor 110A (or in another processor).

To restore fault tolerance after a single event upset in one of the processors 110, the 100 can synchronize the processor in which the single event upset occurred with the other processors. In case of a fault (single event upset) in the processor 110A, the system 100 suspends operation of the processor 110 (e.g., holds the processor 110A in reset), and isolates this processor from the other components of the system 100, so that the fault in the processor 110A will not cause additional faults or errors in the system 100. The computer system may log the fault In the main memory 140 or elsewhere, for example, recording information that identifies the time of the event, the faulty processor, and the signal or signals on which the fault was detected. Then, the computer system 100 flushes out the data describing the internal processor state of the processors 110B and 110C, and, optionally, of the processor 110A in which the fault occurred.

The state data is data describing the state of internal elements of the processors that can change their state, including counters, registers, and memory elements. Thus, not all of the data may be flushed out of the processors; some data may be recreated, some data may be irrelevant. The state data flushed from the processors 110B and 110C is sufficient to restore these or other identical processors (e.g., the upset processor 110A) to the state that is identical or similar to the state in which the processors 110B and 110C were at the time when the state data were flushed out. As will become clear from the following paragraphs, processor state data in this context may but need not include internal processor cache data.

In some embodiments, the processor state data is flushed from all of the processors, and a majority vote is taken for each data unit, for example, each bit of the flushed data. A single instance of the flushed data in accordance with the majority vote is stored for future use in synchronizing the processors 110. In other words, each data unit of the stored data instance is the same as the majority of corresponding data units of all the processors 110.

After the processor state data is flushed and the single instance of the flushed data in accordance with the majority vote is stored, the processors 110B and 110C are also reset. All the processors 110 are now in a reset state. The processors 110 are then taken out of the reset state and initialized. Processor initialization may included, for example, initialization of the memory management unit (MMU) of the processor. After initialization, the stored state data is reloaded into each processor 110, including the processor 110A. The three processors 110 are thus once again in synchronization (lockstep) with each other. The processors are then allowed to continue running and performing the tasks of the application or applications for which the system 100 is used.

The process of synchronizing the processors 110 in accordance with majority vote is referred to as "processor resynchronization."

A single event upset in a processor may not always be evinced at one of the processor outputs immediately after occurring. Instead, it may be latent upset that changes internal processor state and would affect an output at some later time. During the latency of the single event upset of one processor, another single event upset may affect a second processor of the system 100. In this case, two processors would be affected by single event upsets before processor resynchronization is performed, and the majority vote of the flushed processor state data may be invalid or not defined. Consequently, the system 100 may not be able to recover from the faults using processor resynchronization, and would need to be reset. To reduce probability of such system failures, in some embodiments processor resynchronization may be initiated at some intervals or upon reaching of some predetermined milestones in the application code, regardless of fault detection. The processor resynchronization intervals may be constant or variable. In accordance with this method, processor resynchronization is performed at the scheduled time or milestone even if no upset is detected. If a single event upset is detected in one of the processors 110, the faulty processor is held in reset (or otherwise suspended) until the scheduled processor resynchronization; the remaining processors continue executing code until processor resynchronization is initiated. The upset thus does not affect the operation of most other components of the computer system 100, and is transparent to the user applications code being executed.

For example, processor resynchronization may be performed once a second, whether and error is detected or not. The processor resynchronization interval may also be a variable interval. For example, the interval may be shortened after a fault is in fact detected in one of the processors 110.

In an alternative embodiment, processor resynchronization is performed at some intervals or upon reaching of some predetermined milestone, and upon detection of an upset.

Figure 2:
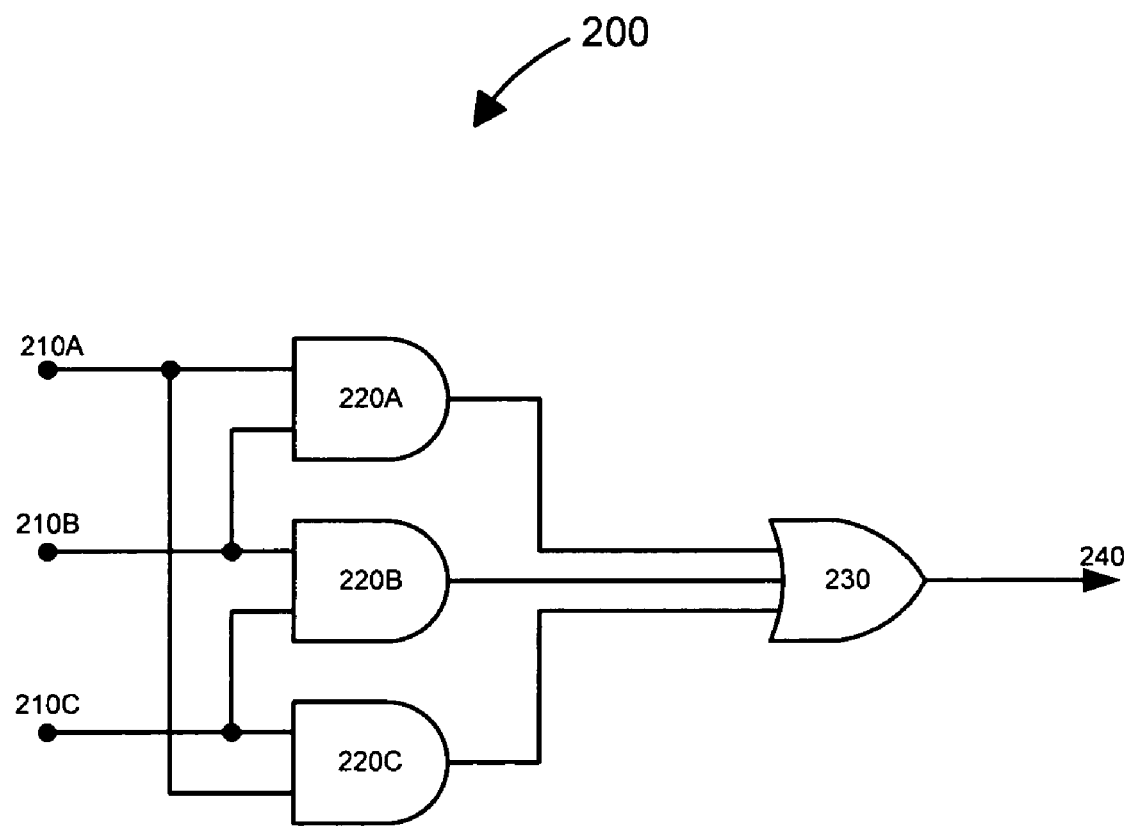
FIG. 2 illustrates selected components of a circuit for determining majority vote output signal from three processor signal outputs, in accordance with some aspects of the present invention.

FIG. 2 illustrates a circuit 200 for determining majority vote output signal 240 from three corresponding processor signal outputs 210A, 210B, and 210C. The circuit 200, which is part of TMR logic 123, includes three AND logic gates 220A, 220B, and 220C, and a three-input OR logic gate 230. As a person skilled in the art should be able to understand after studying FIG. 2, if any two of the processor signal outputs 210A, 210B, and 210C are at a logic 1 level, then the majority vote output signal 240 is also at logic 1 level; if any two of the processor signal outputs 210A, 210B, and 210C are at a logic 0 level, then the majority of vote output signal 240 is also at logic 0 level. The circuit 200 can be extended to operate on more than three processor signal outputs, as would be needed in embodiments with more than three processors. Other circuits may be used for determining the majority vote output signal.

Figure 3:
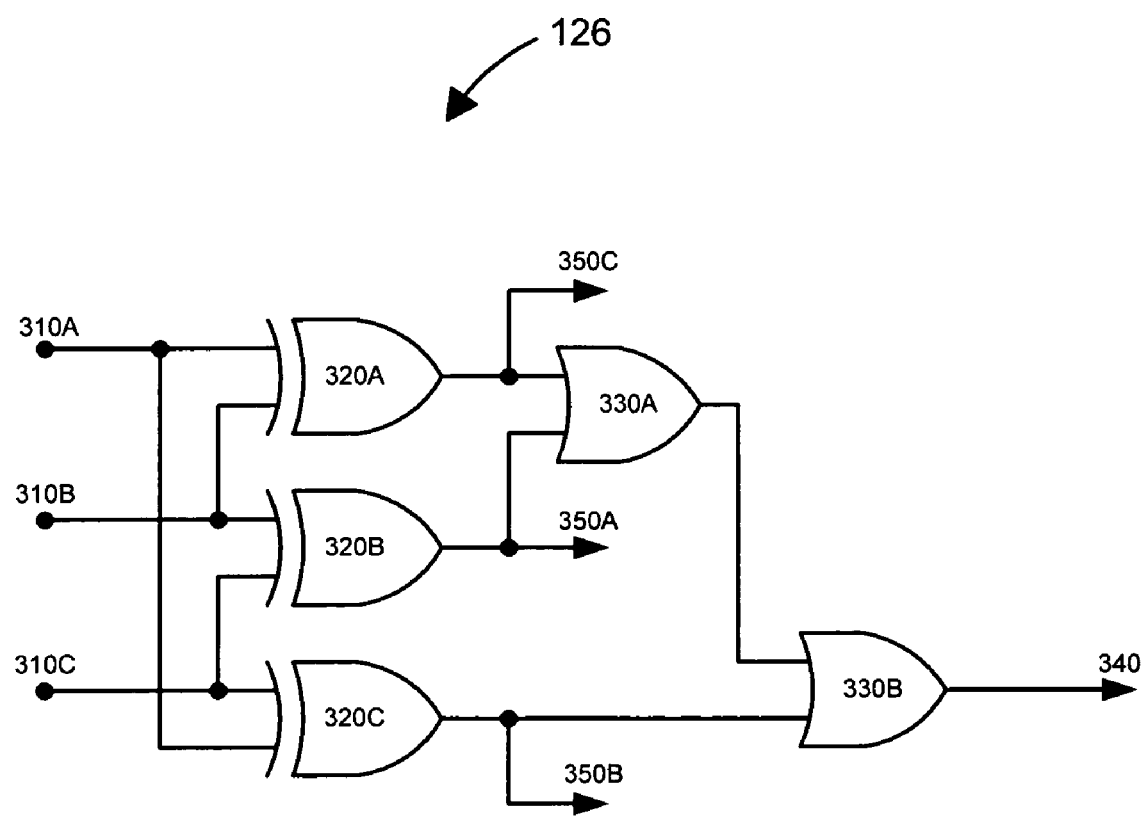
FIG. 3 illustrates selected components of a processor correlation detector module for monitoring corresponding outputs of three processors operating synchronously in parallel, and determining when the three processor outputs are not at the same logic level, in accordance with some aspects of the present invention.

FIG. 3 illustrates an embodiment of the processor correlation detector module 126 for monitoring corresponding outputs 310A, 310B, and 310C of the processors 110, and determining when the three processor outputs are not at the same logic level, signifying a fault in one of the processors 110, such as a single event upset. The processor correlation detector module 126 includes three exclusive-OR (XOR) logic gates 320A, 320B, and 320C, and two dual-input logic OR gates 330A and 330B. As a person skilled in the art should be able to understand after studying FIG. 3, if all the processor signal outputs 310 are the same, the output 340 will remain low; if any of the processor signal outputs 310 differs from the other two processor signal outputs 310, then the output 340 will assume a high state. In the latter case, the outputs 350 can be read to identify the faulty processor. For example, if the output 350A is low, then the signal output 310A differs from the signal outputs 310B and 310C; if the output 350B is low, then the signal output 310B differs from the signal outputs 310A and 310C; if the output 350C is low, then the signal output 310C differs from the signal outputs 310A and 310B. The processor correlation detector module 126 can be extended to operate on more than three processor signal outputs, as would be needed in embodiments with more than three processors. Other circuits may be used for monitoring processor outputs and identifying processors in which a fault (e.g., single event upset) has occurred.

Let us now focus on maintaining processor cache coherency during the processor resynchronization processes described above and in the incorporated disclosures (U.S. patent application Ser. No. 10/418,713 and U.S. Provisional Patent Application Ser. No. 60/451,041). Many processors are provided with on-chip cache memories ("caches") for faster access to recently-accessed data. Particularly in the case of write-back caching, data in the cache (e.g., data in level 1 or "L1" cache) may be more current than the corresponding data stored in the main memory. When an external device tries to access a memory location in the main memory 140, the system 100 needs to determine whether the information in the memory location is also stored in the internal caches of the processors 110. If so, and the cache line has been modified (and therefore differs from the corresponding information stored in the main memory 140), the cache line that stores the latest information corresponding to the memory location needs to be flushed from the internal caches to the main memory 140.

(An "external device" in this context is a device external to the processors 110, e.g., devices of the PCI-IF chip module 150, devices on the backplane PCI bus, and the on-chip direct memory access engine; transactions generated by such devices are "external device transactions.")

Determining if the internal caches in the processors 110 store the latest information in the memory location is referred to as cache "snooping" or simply "snooping." In the embodiment illustrated in FIG. 1, snooping is performed by a 60X Master Bus Snooping component 121. The Snooping component 121 requests the processor bus, generates a transaction to the same memory location that, in effect, tells the processors 110 to flush the data in the memory location to the main memory 140. For example, if an external component comes across the PCI bus to read from an address XXXX XXXX, the read is forwarded to the Snooping component 121, which generates a transaction to XXXX XXXX. If this transaction is a read transaction, the Snooping component 121 would broadcast the corresponding cache line across the PPC buses, notifying the processors 110 of the snooping; the processors 110 would then either flush the cache out or not, depending on whether the memory location XXXX XXXX is stored in the processor caches, and whether the data in the memory location in the cache has been modified. If the processors 110 determine that the memory location in the cache has been modified. if the processors 110 determine that the memory location data is stored in the caches and the data in the location has been modified, the processors 110 generate an address retry (in embodiments using PowerPC® processors) on the bus, telling the Snooping component 121 to get off the bus and retry later. The processors 110 will then grab the bus and flush the cache line corresponding to the address XXXX XXXX. The Snooping component 121 will keep snooping until the processors 110 no longer object, i.e., until the processors 110 determine that the memory location XXXX XXXX is not stored in the cache (or has not been modified), or until the corresponding cache line is flushed out to the main memory 140. Once the memory location XXXX XXXX is flushed out, the processors 110 will not object and will not generate ad address retry. The system 100 (or, more precisely, the system controller 120) will then allow the transaction to go the SDRAM and pick the data at the address XXXX XXXX out.

Importantly, snoop transactions can be generated during processor resynchronization, which includes a period of time when the processors 110 come out of reset. This is so because only the processors 110 are being reset during processor resynchronization, while other components of the computer system 100 (and components connected to the computer system 100) not to be synchronized at the end of processor resynchronization. Such outcome would result in a system failure and therefore should be prevented.

Figure 4:
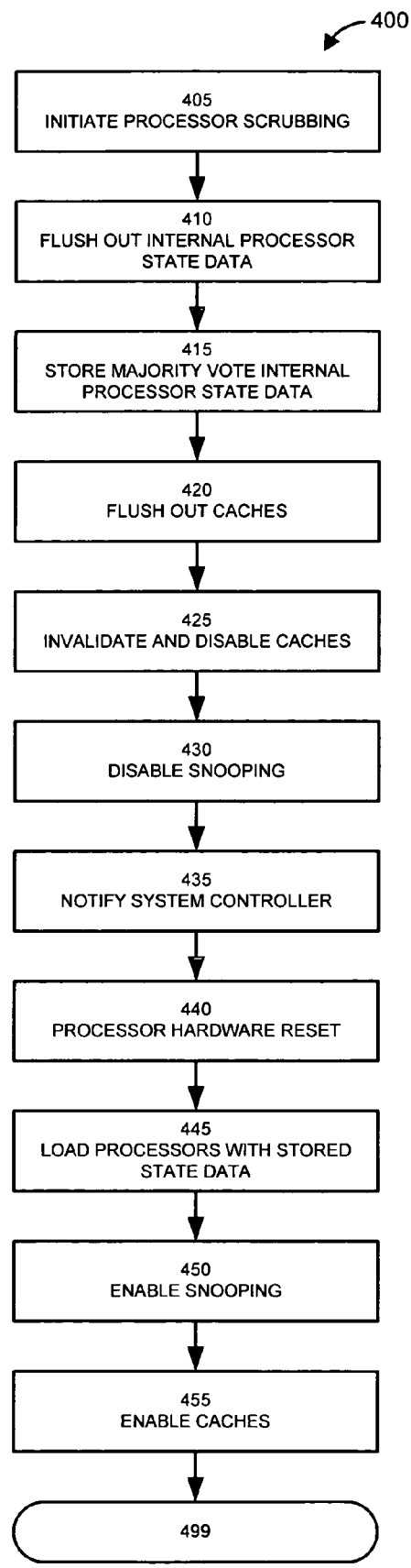
FIG. 4 illustrates selected steps of a processor resynchronization method, in accordance with some aspects of the present invention.

FIG. 4 is a process flow diagram illustrating selected steps of a method 400 for processor resynchronization that reduces or eliminates snooping transactions when the processors 110 are coming out of reset initiated during processor resynchronization. In accordance with this process, caches are not reloaded/restored in the course of processor resynchronization, and snooping by hardware (the system controller 120) is bypassed or skipped (because the caches are empty) during at least some portion of processor resynchronization.

The method 400 is described with reference to the computer system 100, but may also be performed in other system.

In the computer system embodiment of FIG. 1, the steps of the method 400 (and particularly the steps 410 through 455) are performed or in whole or in part by the resynchronization state machine 127 in combination with software.

Although certain steps of the method 400 are described serially, some of these steps can be performed by separate elements in conjunction or in parallel, asynchronously or synchronously, in a pipelined manner, or otherwise. There is no particular requirement that the steps be performed in the same order in which this description lists them, except where explicitly so indicated, otherwise made clear from the context, or inherently required. Furthermore, not every illustrated step is required in every embodiment in accordance with the invention, while some steps that have not been specifically illustrated may be desirable or necessary in some embodiments in accordance with the invention. It should be noted, however, that the method 400 represents a particular embodiment with all of the illustrated steps performed in the given order.

At step 405, the computer system 100 initiates processor resynchronization. As has been discussed above, processor resynchronization may be initiated at some time previously determined, upon reaching a particular milestone, or in response to a fault in the processors 110, for example, a single event upset.

At step 410, the computer system flushes out the data describing the internal processor state of the processors 110A, 110B, and 110C. Internal processor caches need not but may be flushed out as part of this step. If the processor caches are not flushed out, it is usually because they are coherent with the main memory, for example, when using write-through instead of write back cache policies.

At step 415, the computer system 100 stores a majority vote instance of the internal processor state data. In the stored instance, each data unit (e.g., bit, octet, byte, or another unit) is determined in accordance with the states of the majority of the processors 110, as has been described above. The instance may be stored in unused address locations of the main memory 140, or elsewhere.

At step 420, internal processor caches (e.g., L1 caches) of the processors 110 are flushed out so that the data in the main memory 140 is updated with more current data in the internal processor caches. This step may be combined with the step 410.

At step 425, the internal processor caches of the processors 110 are invalidated and disabled. It should be noted that the caches may not need to be disabled. For example, the caches may not need to be disabled if the processors are about to be reset.

At step 430, snooping is caused to be bypassed or skipped. In some embodiments, this step is taken after the internal processor caches are flushed, invalidated, and disabled in the steps 420 and 425. Bypassing snooping prevents snooping due to external device activity at a later point, when the processors 110 will be initializing when coming out of reset.

At step 435, the system controller 120 is notified that software is done, i.e., that snooping has been disabled.

In response to the notification of the step 435, the system controller 120 resets the processors 110, at step 440. If no single event upset has been detected in any of the processors 110, all three processors are reset in this step; if a single event upset had previously been detected, the faulty processor continues to be kept in reset while the non-faulty processors are reset. The processors 110 may be released from the reset state at substantially the same time, e.g., on the same clock cycle.

After the processors 110 have been reset, they are loaded with the processor state data of the majority vote instance of the data, which was stored in the step 415. This takes place at step 445.

After the processor state data are loaded in the step 445, the processors 110 should be in synchrony with each other. Snooping is now enabled, at step 450.

Internal processor caches of the processors 110 are enabled, at step 455, and the method 400 terminates at a flow point 499. The computer system 100 can now continue executing user application code that it was executing prior to the processor resynchronization of the method 400.

The inventive fault-tolerant computer systems and processor resynchronization methods have been described above in considerable detail. This was done illustration purposes. Neither the specific embodiments of the invention as a whole, nor those of its features, limit the general principles underlying the invention. In particular, the invention is not necessarily limited to the specific processors or computer system components mentioned. The invention is also not necessarily limited to three processors and triple module redundancy, but extends to systems with other processor quantities. The invention also extends to methods for preventing bus transactions while processors come out of reset. The specific features described herein may be used in some embodiments, but not in others, without departure from the spirit and scope of the invention as set forth. Many additional modifications are intended in the foregoing disclosure, and it will be appreciated by those of ordinary skill in the art that, in some instances, some features of the invention will be employed in the absence of a corresponding use of other features. The illustrative examples therefore do not define the metes and bounds of the invention and the legal protection afforded the invention, which function is served by the claims and their equivalents.

We claim:

1. A method of operating a fault-tolerant computer system with a plurality of processors, the method comprising:

flushing out internal processor state data from processors of the plurality of processors;

determining an instance of the flushed out internal processor state data in accordance with processor majority vote;

storing the instance of the flushed out internal processor state data;

invalidating and disabling caches of the processors of the plurality of processors;

disabling snooping;

holding each processor of the plurality of processors in reset;

loading said each processor of the plurality of processors with the instance of the flushed out internal processor state data;

enabling snooping; and enabling the caches of the processors of the plurality of processors;

wherein:

the step of disabling snooping is performed after the steps of invalidating and disabling caches;

the step of holding each processor of the plurality of processors in reset is performed after the step of disabling snooping;

the step of loading is performed after the step of holding each processor of the plurality of processors in reset; and the step of enabling snooping is performed after the step of loading.

2. The method of claim 1, further comprising:

synchronously operating the processors of the plurality of processors in parallel while determining processor majority vote of processor output signals.

3. A method of operating a fault-tolerant computer system with a plurality of processors, the method comprising:

flushing out internal processor state data from processors of the plurality of processors;

determining an instance of the flushed out internal processor state data in accordance with processor majority vote;

storing the instance of the flushed out internal processor state data;

invalidating and disabling caches of the processors of the plurality of processors;

disabling snooping;

holding each processor of the plurality of processors in reset;

loading said each processor of the plurality of processors with the instance of the flushed out internal processor state data;

enabling snooping;

enabling the caches of the processors of the plurality of processors;

first synchronously operating the processors of the plurality of processors in parallel while determining processor majority vote of processor output signals; and second synchronously operating the processors of the plurality of processors in parallel while determining processor majority vote of processor output signals;

wherein:

the step of disabling snooping is performed after the steps of invalidating and disabling caches;

the step of holding each processor of the plurality of processors in reset is performed after the step of disabling snooping;

the step of loading is performed after the step of holding each processor of the plurality of processors in reset;

the step of enabling snooping is performed after the step of loading;

the step of first synchronously operating is performed before the step of flushing out internal processor state data; and the step of second synchronously operating is performed after the step of loading.

4. The method of claim 3, further comprising:

flushing out the caches of the processors of the plurality of processors between the step of flushing out internal processor state data from processors of the plurality of processors and the step of invalidating.

5. The method of claim 4, wherein the step of flushing out internal processor slate data is performed at predetermined times.

6. The method of claim 4, wherein the step of flushing out internal processor state data is performed at predetermined milestones.

7. The method of claim 4, wherein the step of flushing out internal processor state data is performed at predetermined milestones of at least one software application executed by the computer system.

8. The method of claim 4, wherein the step of flushing out internal processor state data is performed in response to a single event upset in at least one processor of the plurality of processors.

9. The method of claim 4, wherein the step of flushing out internal processor state data is performed at predetermined intervals, further comprising:

shortening at least one of the intervals in response to an error in at least one processor of the plurality of processors.

10. The method of claim 4, wherein the step of flushing out internal processor state data is performed in response to loss of synchronization of a first processor of the plurality of processors with respect to at least a second processor and a third processor of the plurality of processors.

11. The method of claim 4, wherein the instance does not include data stored in the caches of the processors of the plurality of processors.

12. The method of claim 4, wherein the instance includes all internal processor state data other than cache data stored in the caches of the processors of the plurality of processors.

13. A method of restoring synchronous operation of a plurality of processors in a computer system, the method comprising:

determining an instance of internal processor state data in accordance with processor majority vote of the plurality of processors;

storing the instance;

disabling caches of the processors of the plurality of processors;

after the step of disabling caches, disabling cache snooping;

after the step of disabling cache snooping, resetting each processor of the plurality of processors;

after the step of resetting, loading said each processor of the plurality of processors with the instance;

after the step of loading, enabling cache snooping;

after the step of enabling cache snooping, enabling the caches of the processors of the plurality of processors;

causing the processors of the plurality of processors to operate synchronously in parallel to execute application code.

14. The method of claim 13, further comprising:

flushing out internal processor slate data before the step of resetting.

15. The method of claim 13, further comprising:

flushing out internal processor state data before the step of resetting and after the step of disabling caches.

16. A fault-tolerant computer system comprising:

a plurality of processors configured to operate synchronously in parallel;

multi-module redundancy logic configured to receive outputs of each processor of the plurality of processors, and determine majority processor vote for each set of corresponding processor outputs; and resynchronization state machine configured to determine an instance of internal processor state data in accordance with processor majority vote of the plurality of processors, store the instance, disable caches of said each processor of the plurality of processors, disable cache snooping after disabling caches, reset said each processor of the plurality of processors after disabling cache snooping, after resetting, load said each processor with the stored instance, enable snooping after loading said each processor of the plurality of processors with the stored instance, and enable the caches after enabling snooping, whereby the resynchronization state machine restores synchronous operation of the plurality of processors and prevents snooping white the plurality of processors comes out of reset.

17. The computer system of claim 16, further comprising:
a plurality of processor buses, wherein said each processor of the plurality of processors is coupled to the multi-module redundancy logic by a different processor bus of the plurality of processor buses.

18. The computer system of claim 17, further comprising:
a processor correlation detector module configured to detect when at least one output of at least one processor of the plurality of processors differs from outputs of a plurality of corresponding outputs of the plurality of processors.

19. The computer system of claim 18, further comprising:
a memory controller, wherein the multi-module redundancy logic provides the majority processor vote of at least a plurality of the outputs to the memory controller.

20. The computer system of claim 18, further comprising:
a bus controller, wherein the mold-module redundancy logic provides the majority processor vote of at least a plurality of the outputs to the bus controller.

21. The computer system of claim 18, further comprising:
a PCI bus controller, wherein the multi-module redundancy logic provides the majority processor vote of at least a plurality of the outputs to the PCI bus controller.

22. A fault-tolerant computer system comprising:
a plurality of processors configured to operate synchronously in parallel, wherein the processors may operate with enabled snooping, and wherein the processors may operate with disabled snooping;

means for receiving outputs of the processors, and for determining majority processor vote for each of the outputs; and resynchronization means for synchronizing operation of the plurality of processors and preventing snooping by external devices during time periods when the processors are in reset and initialize coming out of reset.

* * * * *

UNITED STATES PATENT AND TRADEMARK OFFICE
CERTIFICATE OF CORRECTION

| | | |
|---|---|---|
| PATENT NO. | : 7,415,630 B2 | Page 1 of 1 |
| APPLICATION NO. | : 11/356945 | |
| DATED | : August 19, 2008 | |
| INVENTOR(S) | : Robert A. Hillman and Mark Steven Conrad | |

It is certified that error appears in the above-identified patent and that said Letters Patent is hereby corrected as shown below:

Column 12, line 51, cancel "slate" and replace the cancelled text with --state--;

Column 13, line 13, cancel "white" and replace the cancelled text with --while--.

Signed and Sealed this

Thirtieth Day of September, 2008

JON W. DUDAS
*Director of the United States Patent and Trademark Office*